3,174,991
PRODUCTION OF UREA DERIVATIVES
Gustav Steinbrunn, Schwegenheim, Germany, assignor to Badische Anilin- & Soda-Fabrik Aktiengesellschaft, Ludwigshafen (Rhine), Germany
No drawing. Filed Feb. 15, 1961, Serial No. 89,350.
Claims priority, application Germany, Feb. 18, 1960, B 56,710; Aug. 5, 1960, B 58,874; Aug. 17, 1960, B 59,003
1 Claim. (Cl. 260—465)

This invention relates to a process for the production of urea derivatives. More particularly, it relates to a process for the production of N-alkyl-N'-hydroxyureas and N-aryl-N'-hydroxyureas.

It is known that N-phenyl-N'-hydroxyurea is obtained by reacting phenyl isocyanate with hydroxylamine in aqueous solution. In this process a large excess of hydroxylamine, viz. about 4 mols of hydroxylamine per mol of phenyl isocyanate must be used.

It is the object of the present invention to provide a process for the production of N-hydroxyurea derivatives which can be conducted with considerable saving of hydroxylamine or its derivatives.

I have now found that N-hydroxyurea derivatives of the general formula:

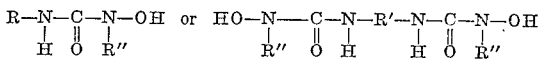

can be obtained by reacting 1 equivalent of an isocyanate or carbamyl chloride, i.e., 1 mol of an isocyanate of the formula:

$$R-N=C=O$$

or of a carbamyl chloride of the formula:

or ½ mol of a diisocyanate of the formula:

$$O=C=N-R'-N=C=O$$

or of a dicarbamyl chloride of the formula:

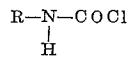

with about 1 to 3 mols of a hydroxylamine of the formula:

$$R''-NHOH$$

in the presence of water and of an organic solvent which reacts neither with the isocyanate, diisocyanate, carbamyl chloride or dicarbamyl chloride nor with the hydroxylamine.

In the foregoing formulae, R, R' and R'' have the following meanings: R stands for phenyl which may be mono-, di- or tri-substituted by alkyl containing 1 to 4 carbon atoms, alkenyl containing 2 to 3 carbon atoms, alkoxy containing 1 to 2 carbon atoms, chlorine or bromine; naphthyl which may be mono-, di- or tri-substituted by alkyl containing 1 to 4 carbon atoms, alkenyl containing 2 to 3 carbon atoms, alkoxy containing 1 to 2 carbon atoms, chlorine or bromine; alkyl containing 1 to 3 carbon atoms; aralkyl containing 1 carbon atom in the alkyl component; halogenalkyl in which the halogen is chlorine or bromine; halogen-aralkyl in which the halogen is chlorine or bromine; cyanoalkyl; cyanoaralkyl; cycloalkyl containing 6 to 8 carbon atoms as ring members; alkenyl containing 2 to 3 carbon atoms; alkinyl containing 3 to 5 carbon atoms; or a radical of the formula

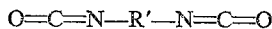

wherein X represents hydrogen, methyl, chloromethyl, bromine or methoxyl and $n$ represents one of the integers 1 and 2; R' stands for phenylene which may be mono-, di- or tri-substituted by alkyl containing 1 to 4 carbon atoms, alkenyl containing 2 to 3 carbon atoms, chlorine or bromine; naphthylene which may be mono-, di- or tri-substituted by alkyl containing 1 to 4 carbon atoms, alkenyl containing 2 to 3 carbon atoms, chlorine or bromine; alkylene containing 2 to 8 carbon atoms; aralkylene containing 1 to 2 carbon atoms in the alkylene component; or cycloalkylene containing 6 to 8 carbon atoms as ring members; R'' stands for hydrogen; alkyl containing 1 to 8 carbon atoms; or alkenyl containing 3 carbon atoms.

The reaction between the isocyanate, diisocyanate, carbamyl chloride or dicarbamyl chloride and the hydroxylamine is carried out at a temperature of about 0° to 70° C., preferably of about 10° to 35° C.

The reaction is conducted in the presence of water and of an organic solvent which reacts neither with the isocyanate, diisocyanate, carbamyl chloride or dicarbamyl chloride nor with the hydroxylamine. The amount of water used in the reaction may be varied within wide limits, viz., between about 0.5 and 40, preferably between about 1 and 30, parts by weight with reference to the amount of hydroxylamine. The organic solvents or diluents may be employed in amounts of about 0.5 to 40 parts by weight with reference to the amount of isocyanate or carbamyl chloride. The proportion of water to organic solvent or diluent may be between about 1:0.1 parts by weight and about 1:5 parts by weight.

Suitable organic solvents or diluents include dialkyl ethers, such as diethyl ether, diisopropyl ether and dibutyl ether; chlorinated dialkyl ethers, such as β,β-dichlorodiethyl ether; hydrocarbons, such as toluene and xylene, chlorinated hydrocarbons, such as methylene chloride, ethylene chloride and chlorobenzenes; and other organic solvents, such as acetonitrile, dioxan, tetrahydrofuran and dimethyl sulfoxide. Mixtures of the said solvents may also be used.

The reaction time depends on the cooling of the reaction mixture, since the reaction is exothermic and should be conducted within the above-mentioned temperature range. The isocyanate or carbamyl chloride is added to the aqueous hydroxylamine solution either continuously or in portions, for example by dripping. The hydroxylamine is used in free form. It is preferable to liberate the hydroxylamine from an aqueous solution of one of its salts by the addition of alkalies. Suitable hydroxylamine salts are the salts of inorganic and organic acids, e.g. the salts of hydrochloric acid, sulfurous acid and acetic acid. Alkalies suitable for the said purpose are those which do not react with the hydroxylamine, e.g., ammonia, sodium hydroxide, potassium hydroxide, ammonium hydroxide, sodium carbonate, potassium carbonate, ammonium carbonate, sodium bicarbonate, potassium bicarbonate, ammonium bicarbonate and tertiary amines, such as pyridine, triethylamine and N,N-dimethylaniline. The yields obtainable by the process according to the present invention are good; in some cases, they are almost quantitative.

Hydroxylamines which may be used in the process according to the invention include hydroxylamine itself and hydroxylamines which are substituted on the nitrogen atom, such as N-methyl-, N-ethyl-, N-butyl-, N-propenyl-, N-β-hydroxyethyl- and N-β-hydroxypropyl-hydroxylamine.

Isocyanates suitable for the process according to the invention include phenyl isocyanate, o-, m- and p-tolyl isocyanate, 2,4-xylidyl isocyanate, o-, m- and p-anisyl isocyanate, m- and p-phenetyl isocyanate, isopropylphenyl isocyanate, diisopropylphenyl isocyanate, butylphenyl isocyanate, isobutylphenyl isocyanate, vinylphenyl isocyanate, propenylphenyl isocyanate, o-, m- and p-chlorophenyl isocyanate, o-, m- and p-chlorotolyl isocyanate, dichlorophenyl isocyanate, dichlorotolyl isocyanate, ethyl isocyanate, propyl isocyanate, butyl isocyanate, amyl isocyanate, hexyl isocyanate, octyl isocyanate, β-chloroethyl isocyanate, γ-chloropropyl isocyanate, ethylhexyl isocyanate, benzyl isocyanate, cyclohexyl isocyanate, cyclooctyl isocyanate, vinyl isocyanate, 1-butine-3-yl isocyanate and o-, m- and p-tolyl sulfoisocyanate. The carbamyl chlorides corresponding to the said isocyanates can be used in the same manner for the process according to the present invention.

Diisocyanates which may be used include 1,3- and 1,4-phenylene diisocyanate, toluylene diisocyanate, ethylphenylene diisocyanate, 1,5-naphthylene diisocyanate, hexamethylene diisocyanate, octamethylene diisocyanate, diphenylmethyl diisocyanate

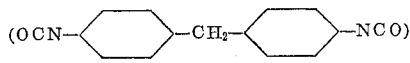

and dicyclohexylmethyl diisocyanate

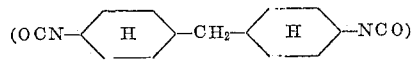

The dicarbamyl chlorides corresponding to the said diisocyanates can be used in the same manner for the process according to the present invention.

The amount of hydroxylamine with reference to the amount of isocyanate, diisocyanate, carbamyl chloride or dicarbamyl chloride can be about stoichiometric, i.e., the hydroxylamine can be used in a molar proportion of 1:1 with reference to an isocyanate or carbamyl chloride, and in a molar proportion of 2:1 with reference to a diisocyanate or dicarbamyl chloride. The hydroxylamine may, however, be applied in a slight excess of up to about 3 mols of hydroxylamine per equivalent of isocyanate, diisocyanate, carbamyl chloride or dicarbamyl chloride.

By alkylating the ureas thus prepared, for example with dimethyl sulfate, diazomethane or toluenesulfonic acid alkyl esters, the corresponding N-alkyl-N-alkoxyureas are obtained, some of which are known as herbicides. The N-hydroxyurea derivatives can be used as intermediate products for the production of pharmaceuticals or plant protection agents.

The invention will be further illustrated, but is not limited, by the following examples. Unless otherwise specified, the parts are by weight. The decomposition temperatures were determined in sealed tubes.

Example 1

70 parts of hydroxylamine hydrochloride are dissolved in 200 parts by weight of water, and 150 parts of diethyl ether are added. 100 parts by volume of a 10 N caustic soda solution are allowed to flow in at 0° to 10° C., while stirring. Then 119 parts of phenyl isocyanate are dripped in at 5° to 10° C., while stirring well, and stirring is continued for another 3 hours at room temperature. The ether is distilled off under reduced pressure. After cooling, the reaction product is filtered off by suction and washed with water. The product is dried in the air, and 158 parts of N-phenyl-N'-hydroxyurea (decomposition point 142° C.) are obtained.

Example 2

9.3 parts of hydroxylamine sulfate are dissolved in 75 parts of water, and 55 parts of diethyl ether are added. While stirring well and applying external cooling, 11.2 parts by volume of a 10 N caustic soda solution are added in portions at 3° to 10° C. 17 parts of phenetyl isocyanate are added at 4° to 10° C. Stirring is continued for another hour at room temperature. The ether is then distilled off and the reaction mixture cooled. The reaction product is filtered off by suction and washed with water. 18 parts of N-p-ethoxyphenyl-N'-hydroxyurea (decomposition point 153° C.) are obtained.

Example 3

19.5 parts of hydroxylamine hydrochloride are dissolved in 130 parts of water, and 172 parts of dibutyl ether are added. While stirring well and applying external cooling, 27.5 parts by volume of a 10 N caustic soda solution are added in portions at 10° to 15° C. Then 32 parts of p-tolyl isocyanate are added at 5° to 10° C. Stirring is continued for another hour at room temperature. The reaction product is then filtered off by suction and washed with water and a small amount of methylene chloride. After drying, 32 parts of N-p-tolyl-N'-hydroxyurea (decomposition point 153° C.) are obtained.

If m-tolyl isocyanate is used instead of p-tolyl isocyanate, N-m-tolyl-N'-hydroxyurea (decomposition point 118° C.) is obtained. By methylation with dimethyl sulfate, N-m-tolyl-N'-methyl-N'-methoxyurea (decomposition point 97° to 98° C.) is obtained from the said compound.

Example 4

45 parts of n-dibutyl ether and 270 parts of methylene chloride are added to 77 parts of hydroxylamine hydrochloride dissolved in 350 parts of water. 110 parts by volume of a 10 N caustic soda solution are dripped in at 10° to 13° C., while stirring. Then 154 parts of p-chlorophenyl isocyanate diluted with 200 parts of methylene chloride are slowly dripped in at 8° to 12° C., while stirring vigorously. Stirring is continued for another 3 hours at room temperature. After cooling, the reaction product is filtered off by suction, washed with a small amount of methylene chloride, and then washed free from salt with water. After drying, 182 parts of N-p-chlorophenyl-N'-hydroxyurea (decomposition point 170° C.) are obtained.

Example 5

55 parts by volume of a 10 N caustic soda solution are added in portions, at 3° to 6° C. and while stirring well, to a solution of 38.5 parts of hydroxylamine hydrochloride in 400 parts of water to which 150 parts of diethyl ether have been added. Then 77 parts of m-chlorophenyl isocyanate are added at 5° to 10° C. in the course of one hour, while stirring rapidly. Stirring is continued for another 2 hours at room temperature. The ether is distilled off and, after cooling, the reaction product is filtered off by suction and washed with water. 87 parts of N-m-chlorophenyl-N'-hydroxyurea (decomposition point 95° C.) are obtained. After purification, the product has a decomposition point of 128° C.

By using 3,4-dichlorophenyl isocyanate instead of m-chlorophenyl isocyanate, N-3,4-dichlorophenyl-N'-hydroxyurea (decomposition point 127° C.) is obtained.

Example 6

75 parts of diethyl ether and 25 parts of dibutyl ether are added to 38.5 parts of hydroxylamine hydrochloride dissolved in 250 parts of water. While stirring well, 55 parts by volume of a 10 N caustic soda solution are added at 5° to 10° C., and then 40 parts of toluylene diisocyanate at the same temperature. The diethyl ether is removed under reduced pressure, the reaction product filtered off by suction, washed once with a small amount of ether, and then washed with water. 43 parts of toluylene-bis-ω-hydroxyurea (decomposition point 170° C.) are obtained.

Example 7

1 part of dibutyl ether is added to a solution of 38.5 parts of hydroxylamine hydrochloride and 3 parts of sodium ethylenediaminetetraacetate in 300 parts of water. Then 50 parts by volume of a 10 N caustic soda solution are added at 5° to 10° C., while stirring. 60 parts of phenyl isocyanate dissolved in 47 parts of dibutyl ether are dripped in at 5° to 10° C. in the course of one hour, while stirring vigorously. The reaction is allowed to continue to completion for 1½ hours at room temperature, while stirring. 79 parts of N-phenyl-N'-hydroxyurea (decomposition point 142° C.) are obtained.

Example 8

125 parts of ethylene chloride are added to a solution of 40 parts (0.575 mol) of hydroxylamine hydrochloride in 200 parts of water. Then 55 parts by volume of a 10 N caustic soda solution are dripped in at 10° to 20° C., while stirring. 52 parts (0.25 mole) of 1,5-naphthylene diisocyanate dissolved in 600 parts of ethylene chloride are slowly added at 15° to 30° C. Stirring is continued for some time at 30° C. The crystalline product which forms is filtered off by suction, washed with water and dried in a vacuum cabinet. 67 parts of N,N'-1,5-naphthylene-N'', N'''-di-(hydroxyurea) (decomposition point 205° C.) are obtained.

Example 9

92 parts of ammonia gas are introduced, at a temperature below 15° C. and while stirring, into 3,100 parts by volume of hydroxylamine sulfate solution (which contains 117.4 parts by weight of the sulfate and about 0.15 mol of sulfuric acid per 1,000 parts by volume) and 480 parts by weight of toluene. 2 parts of sodium ethylenediaminetetraacetate are added, and then 614 parts of p-chlorophenyl isocyanate dissolved in 500 parts of dry toluene are allowed to flow in at 20° to 35° C. in the course of about 2 hours. The reaction is allowed to continue to completion for one hour at 30° to 35° C. The product is worked up as described in Example 8 and dried in vacuo at 50° C.

544 parts of N-p-chlorophenyl-N'-hydroxyurea (decomposition point 171° C.) are obtained.

Example 10

23 parts of ammonia are introduced, at 26° to 40° C. and while stirring, into 795 parts by volume of hydroxylamine sulfate solution (which contains 114.5 parts by weight of hydroxylamine sulfate and 17 parts by weight of sulfuric acid per 1,000 parts by volume) and 80 parts of toluene. Then 153.5 parts of p-chlorophenyl isocyanate dissolved in 120 parts of dry toluene are dripped in at 53° to 60° C. Stirring is continued for another hour, the temperature being allowed to fall during the operation. After cooling, the product is filtered off by suction and washed with water. After drying, 180 parts of N - p - chlorophenyl - N' - hydroxyurea (decomposition point 171° C.) are obtained.

Example 11

200 parts of toluene are added to 35 parts (0.5 mol) of hydroxylamine hydrochloride dissolved in 150 parts of water. Then 48 parts by volume of a 10 N caustic soda solution are added, at a temperature below 20° C. and while stirring, and subsequently 75 parts (0.45 mol) of m-chloro-p-tolyl isocyanate are dripped in at 10° to 25° C. Stirring is continued for some time at a temperature below 30° C., and the crystalline product is filtered off by suction. After drying at 50° C. under reduced pressure, 86 parts of N-m-chloro-p-tolyl-N'-hydroxyurea (decomposition point 152° C.) are obtained.

Example 12

250 parts of ethylene chloride are added to 20 parts (0.287 mol) of hydroxylamine hydrochloride and 1 part of sodium ethylenediaminetetraacetate which have been dissolved in 125 parts of water. 27.5 parts by volume of a 10 N caustic soda solution are added at 10° to 20° C., while stirring. Then 25 parts (0.25 mol) of n-butyl isocyanate are dripped in at 10° to 20° C. The reaction is allowed to continue to completion for half an hour at room temperature. After cooling the crystalline reaction product is filtered off by suction and dried in vacuo at 50° C. 28 parts of N-n-butyl-N'-hydroxyurea (decomposition point 123° to 125° C.) are obtained. The compound is readily soluble in water.

Example 13

150 parts of ethylene chloride are added to 21 parts (0.31 mol) of hydroxylamine hydrochloride dissolved in 100 parts of water. While stirring, 30 parts by volume of a 10 N caustic soda solution are added at a temperature of up to about 10° C. 42 parts (0.27 mol) of 2-ethylhexyl isocyanate are slowly added at 10° to 20° C. An emulsion forms. The mixture is stirred for another half hour at room temperature. On cooling the mixture to 0° C., the reaction product crystallizes out. 44 parts of N-(2-ethyl)-hexyl-N'-hydroxyurea are obtained. The product is of a wax-like nature and decomposes at 51° to 53° C.

Example 14

200 parts of ethylene chloride are added to 20 parts (0.287 mol) of hydroxylamine hydrochloride dissolved in 100 parts of water. While stirring, 27.5 parts by volume of a 10 N caustic soda solution are added at 10° to 15° C., and 30 parts (0.25 mol) of δ-chloropropyl isocyanate at 10° to 20° C. Stirring is continued for some time at room temperature to complete the reaction, and the crystalline precipitate is filtered off by suction. The compound thus obtained, N-δ-chloropropyl-N'-hydroxyurea, is water-soluble. It is dried in vacuo at about 50° C. 29 parts are obtained. The decomposition point of the product is 103° to 105° C.

Example 15

27.5 parts by volume of a 10 N caustic soda solution and then 31 parts (0.25 mol) of cyclohexyl isocyanate are dripped at a temperature below 20° C. and while stirring, into 20 parts (0.267) mol) of hydroxylamine hydrochloride dissolved in 125 parts of water, and 120 parts of toluene. The reaction is allowed to continue to completion for one hour at room temperature. After cooling, the crystalline product is filtered off by suction and dried in vacuo. 35 parts of N-cyclohexyl-N'-hydroxyurea are obtained. The product is readily soluble in water and has a decomposition point of 112° to 113° C.

Example 16

120 parts of toluene are added to 20 parts (0.287 mol) of hydroxylamine hydrochloride and 1 part of sodium ethylenediaminetetraacetate dissolved in 75 parts of water. While stirring, 27.5 parts by volume of a 10 N caustic soda solution are dripped in at 10° to 15° C., and 28 parts (0.183 mol) of cyclooctyl isocyanate at 10° to 20° C. Stirring is continued for another hour at room temperature. The crystalline product is then filtered off by suction, washed free from salt with water, and dried in vacuo at about 50° C. 26 parts of N-cyclooctyl-N'-hydroxyurea (decomposition point 102° to 104° C.) are obtained.

Example 17

180 parts of ethylene chloride are added to 16 parts (0.23 mol) of hydroxylamine hydrochloride dissolved in 75 parts of water. While stirring, 22 parts by volume of a 10 N caustic soda solution are added at 10° to 20° C. 26 parts (0.2 mol) of 1-chloro-2-butine-4-yl isocyanate are slowly added to this mixture at 15° to 22° C. Stirring is continued for some time at room temperature. After cooling, the finely crystalline precipitate is filtered off by suction. 27 parts of N-1-chloro-2-butine-4-yl-N'-hydroxyurea (decomposition point 121° to 122° C.) are obtained. The compound is readily soluble in water.

Example 18

120 parts of toluene are added to an aqueous hydroxylamine solution prepared from 20 parts of hydroxylamine hydrochloride, 130 parts of water and 27.5 parts by volume of a 10 N caustic soda solution. While stirring, 49 parts of p-toluenesulfonyl isocyanate are allowed to flow in slowly at 15° to 25° C. The reaction is allowed to continue to completion for half an hour at 25° to 30° C. After cooling, the deposited N-p-toluenesulfonyl-N'-hydroxyurea is filtered off by suction and dried. The yield is 45 parts. The compound is readily soluble in water and has a decomposition point of 124° to 126° C. The compound has the following constitutional formula:

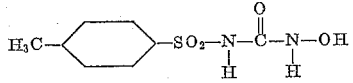

Example 19

40 parts (0.575 mol) of hydroxylamine hydrochloride and 1 part of ethylenediaminotetraacetic acid are dissolved in 200 parts of water, and 250 parts of ethylene chloride added. While stirring, 55 parts by volume of a 10 N caustic soda solution are added at a temperature below 15° C. 42 parts of 1,6-hexamethylene diisocyanate are dripped in at 10° to 20° C. Stirring is continued for some time at room temperature. Then the crystalline reaction product is filtered off by suction. It is readily soluble in water. 54 parts of N,N'-bis-(hydroxycarbamyl)-hexamethylenediamine (decomposition point 169° C.) are obtained.

Example 20

375 parts of ethylene chloride are added to 40 parts of hydroxylamine hydrochloride and 0.5 part of sodium ethylene diaminotetraacetate dissolved in 150 parts of water. Then 55 parts by volume of a 10 N caustic soda solution are added at 20° C., while stirring, and 35 parts of vinyl isocyanate are dripped in at 15° to 20° C. The mixture is maintained at room temperature for some time and the crystalline reaction product which has been deposited in the meantime is filtered off by suction. It is readily soluble in water. 32 parts of N-vinyl-N'-hydroxyurea (decomposition point 112° C.) are obtained.

Example 21

320 parts of ether are added to 160 parts (2.3 mols) of hydroxylamine hydroxychloride dissolved in 300 parts of water. While stirring, 220 parts by volume of a 10 N caustic soda solution are added at 5° to 10° C. 174 parts (1 mol) of 2,4-toluylene diisocyanate are dripped in at the same temperature. The reaction is allowed to continue to completion at room temperature. The crystalline reaction product is filtered off by suction, washed free from salt with water, and dried in vacuo at 50° C. 224 parts of N,N'-2,4-toluylene-N'',N'''-di-(hydroxyurea) with a decomposition point of 164° C. are obtained.

Example 22

500 parts of methylene chloride and 40 parts of dibutyl ether are added to 133 parts of N-methylhydroxylamine hydrochloride dissolved in 400 parts of water. 156 parts by volume of a 10 N caustic soda solution are dripped in, while stirring. Then 210 parts of p-chlorophenyl isocyanate dissolved in 250 parts of methylene chloride are dripped in at 5° to 10° C., while stirring vigorously. The reaction is allowed to continue to completion at room temperature and the crystalline precipitate filtered off by suction. The crude product is introduced, at 10° to 15° C. and while stirring, into a mixture of 500 parts of water and 250 parts by volume of a 10 N caustic soda solution. The solution is filtered by suction, and the dissolved substance is precipitated again by adding dilute acid, filtered off and washed. 187 parts of N-p-chlorophenyl-N'-methyl-N'-hydroxyurea are obtained. The compound is readily soluble in water and has a decomposition point of 137° to 138° C.

Example 23

160 parts of toluene are added to 54 parts (0.55 mol) of N-ethylhydroxylamine hydrochloride dissolved in 100 parts of water. 53 parts by volume of a 10 N caustic soda solution are dripped in at 10° to 25° C., while stirring. 60 parts of phenyl isocyanate are slowly added at 10° to 20° C. The reaction is allowed to continue to completion for some time at room temperature. A small amount of precipitate is formed, which is filtered off by suction and rejected.

The toluene and part of the water are distilled off from the filtrate under reduced pressure, a crystalline product being precipitated. The precipitate is filtered off by suction, washed with water and dried in vacuo. 61 parts of a crude product are obtained which decomposes at 82° to 85° C. After recrystallization from methylene chloride with petroleum ether, the N-phenyl-N'-ethyl-N'-hydroxyurea obtained decomposes at 93° to 95° C. It is readily soluble in water.

Analysis of the substance.—Calculated: N, 15.64%. Found: N, 15.31%.

Example 24

320 parts of diethyl ether are added to 184 parts (2.2 mols) of N-methylhydroxylamine hydrochloride and 0.5 part of sodium ethylenediaminotetraacetate dissolved in 400 parts of water. 218 parts by volume of a 10 N caustic soda solution are dripped in at 5° to 15° C., while stirring.

Then 174 parts (1 mol) of 2,4-toluylene diisocyanate are dripped in at 10° to 15° C., while stirring well. After all the diisocyanate has been added, the temperature of the reaction mixture is allowed to rise and the reaction is allowed to continue to completion for about an hour at room temperature. The reaction product is precipitated as an oily to greasy substance and becomes crystalline as the reaction continues toward completion. The deposition of crystalline substance can be accelerated by adding seed crystals.

The crystalline reaction product is filtered off by suction, washed with water and dried in vacuo at 50° C. 215 parts of a urea derivative of the formula:

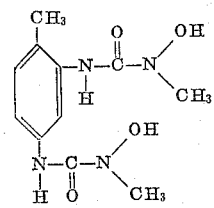

are obtained. The product decomposes at 139° C. and is readily soluble in alkali.

Example 25

60 parts of ether and 20 parts of benzene are added to 54 parts of ethylhydroxylamine hydrochloride dissolved in 100 parts of water. 53 parts by volume of a 10 N caustic soda solution are added at 10° to 15° C., while stirring. Then 43.5 parts (0.25 mol) of 2,4-toluylene diisocyanate are dripped in at 5° to 10° C. Then the reaction is allowed to continue to completion at room temperature. Since the product is precipitated in oily form, the liquid mixture is withdrawn from the reaction vessel. The reaction product is stirred with cold water. It thus becomes crystalline and can be filtered off. It is washed free from salt with water and dried in a vacuum cabinet at 50° C.

60 parts of N,N'-2,4-toluylene-N'',N'''-diethyl-N'',N'''-di(hydroxyurea) with a decomposition point of 117° C. are obtained. The product is soluble in alkali.

Example 26

42 parts of hydroxylamine hydrochloride are dissolved in 200 parts of water, and 40 parts of methylene chloride are added to the solution. 55 parts by volume of a 10 N caustic soda solution are dripped in at a temperature below 10° C., while stirring. In the course of 2 hours, 78 parts of phenylcarbamyl chloride dissolved in 270 parts of methylene chloride and, at the same time, another 55 parts by volume of a 10 N caustic soda solution are added at 5° to 10° C. After addition of the said substances, stirring is continued for some time at room temperature to complete the reaction. The reaction product is filtered off by suction, and the filtration residue is washed with a small amount of water and dried in vacuo at 50° C. 72 parts of N-phenyl-N'-hydroxyurea (decomposition point 142° C.) are obtained.

*Example 27*

35 parts of hydroxylamine hydrochloride are dissolved in 150 parts of water, and 270 parts by volume of methylene chloride are added to the solution. 48 parts by volume of a 10 N caustic soda solution are dripped in at a temperature below 10° C., while stirring. In the course of one hour, 41 parts of N,N'-2,4-toluylene dicarbamyl chloride dissolved in 120 parts by volume of acetonitrile and, at the same time, another 34 parts by volume of a 10 N caustic soda solution are dripped in at 18° to 25° C. The reaction mixture is maintained at the same temperature for some time to complete the reaction. The mixture is then cooled with ice water and the crystalline reaction product filtered off by suction. The filtration residue is washed with water and dried in vacuo at 50° C. 35 parts of 2,4-toluylene-bis-ω-hydroxyurea (decomposition point 161° C.) are obtained.

*Example 28*

42 parts of hydroxylamine hydrochloride are dissolved in 200 parts of water, and 400 parts by volume of methylene chloride are added to the solution. 58 parts by volume of a 10 N caustic soda solution are slowly added at a temperature below 15° C., while stirring. In the course of one hour, 84 parts of p-chlorophenylcarbamyl chloride dissolved in 300 parts of acetonitrile and, at the same time, another 45 parts by volume of a 10 N caustic soda solution are dripped in at 10° to 20° C. Stirring is continued for 2 hours at 18° to 20° C. After cooling, the precipitated reaction product is filtered off by suction, washed with water and dried in vacuo. 70 parts of N-p-chlorophenyl-N'-hydroxyurea (decomposition point 171° C.) are obtained.

I claim:

A process for the production of N-hydroxyurea derivatives which comprises adding (A) 1 equivalent of a compound selected from the group consisting of

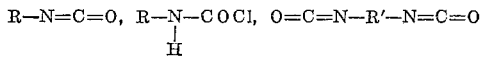

and

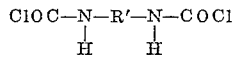

wherein R stands for a member selected from the group consisting of unsubstituted phenyl; monosubstituted phenyl; monosubstituted phenyl; di-substituted phenyl; tri-substituted phenyl, said substituted phenyls being substituted by a member selected from the class consisting of alkyl containing from 1 to 4 carbon atoms, alkenyl containing 2 to 3 carbon atoms, alkoxy containing 1 to 2 carbon atoms, chlorine, and bromine; unsubstituted naphthyl; monosubstituted naphthyl; di-substituted naphthyl; tri-substituted naphthyl, said substituted naphthyls being substituted by a member selected from the class consisting of alkyl containing 1 to 4 carbon atoms, alkenyl containing 2 to 3 carbon atoms, alkoxy containing 1 to 2 carbon atoms, chlorine, and bromine; alkyl containing 1 to 3 carbon atoms; aralkyl containing 1 carbon atom in its alkyl component; halogenalkyl containing from 1 to 3 carbon atoms wherein the halogen is selected from the group consisting of chlorine and bromine; halogenaralkyl containing 1 carbon atom in its alkyl component wherein the halogen is selected from the group consisting of chlorine and bromine; cyanoalkyl containing 1 to 3 carbon atoms in its alkyl component; cyanoaralkyl containing 1 carbon atom in its alkyl component; cycloalkyl containing 6 to 8 ring carbon atoms; alkenyl containing 2 to 3 carbon atoms; alkinyl containing 3 to 5 carbon atoms; and

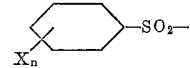

wherein X is selected from the group consisting of hydrogen, methyl, chloromethyl, bromine and methoxyl and n is an integer of from 1 to 2: wherein R' is selected from the group consisting of unsubstituted phenylene; monosubstituted phenylene; di-substituted phenylene; tri-substituted phenylene, said substituted phenylenes being substituted by a member selected from the class consisting of alkyl containing from 1 to 4 carbon atoms, alkenyl containing 2 to 3 carbon atoms, chlorine, and bromine; unsubstituted naphthylene; monostubstituted naphthylene; di-substituted naphthylene; tri-substituted naphthylene, said substituted naphthylenes being substituted by a member selected from the class consisting of alkyl containing from 1 to 4 carbon atoms, alkenyl containing 2 to 3 carbon atoms, chlorine, and bromine; alkylene containing 2 to 8 carbon atoms; aralkylene containing 1 to 2 carbon atoms in its alkylene component; and cycloalkylene containing 6 to 8 ring carbon atoms; to (B) an aqueous solution containing from 1 to 3 mols of a free hydroxylamine having the formula R''—NHOH wherein R'' is a member selected from the group consisting of hydrogen; alkyl containing 1 to 8 carbon atoms, and alkenyl containing 3 carbon atoms; whereby a reaction takes place between said reactant (A) and said reactant (B), said reaction being carried out in the presence of from about 0.5 to about 40 parts by weight of water with reference to the amount of hydroxylamine present in the reaction mixture, and in the presence of an inert organic solvent, the proportion of water to inert organic solvent in the reaction mixture being from about 1:0.1 part by weight to about 1:5 parts by weight, said reaction being carried out at a temperature of from about 0° to about 70° C.; said free hydroxylamine being formed in situ by liberating said free hydroxylamine from an aqueous solution of a salt of an hydroxylamine by the addition of an alkali to said hydroxylamine salt solution.

References Cited in the file of this patent

UNITED STATES PATENTS

| | | |
|---|---|---|
| 2,288,422 | Rohm | June 30, 1942 |
| 2,960,534 | Scherer et al. | Nov. 15, 1960 |

FOREIGN PATENTS

| | | |
|---|---|---|
| 1,028,986 | Germany | Apr. 30, 1958 |
| 1,076,117 | Germany | Feb. 25, 1960 |

OTHER REFERENCES

Hurd: J. Amer. Chem. Soc., vol. 45 (1923), pages 1472–89, at pages 1481 and 1486.

Hurd et al.: J. Amer. Chem. Soc., vol. 49 (1927), pages 269 to 270.

Durrans: Solvents (Seventh Edition, 1957), page 25.

Degering: Outline of Nitrogen Compounds (1950), page 445.

UNITED STATES PATENT OFFICE
CERTIFICATE OF CORRECTION

Patent No. 3,174,991            March 23, 1965

Gustav Steinbrunn

It is hereby certified that error appears in the above numbered patent requiring correction and that the said Letters Patent should read as corrected below.

Column 6, line 33, for "(0.267) mol)" read -- (0.287 mol) --; column 7, lines 73 and 74, for "striring" read -- stirring --; column 9, line 53, strike out "monosubstituted phenyl;".

Signed and sealed this 24th day of August 1965.

(SEAL)
Attest:

ERNEST W. SWIDER            EDWARD J. BRENNER
Attesting Officer            Commissioner of Patents